April 28, 1964
F. S. STOW, JR
3,131,028
CATALYTIC OXIDATION REACTION OF A HYDROGEN HALIDE TO
PRODUCE THE CORRESPONDING HALOGEN IN A SINGLE
STAGE, HOMOGENEOUS, VAPOR PHASE
USING $NO_2$ AS A CATALYST
Filed May 7, 1962
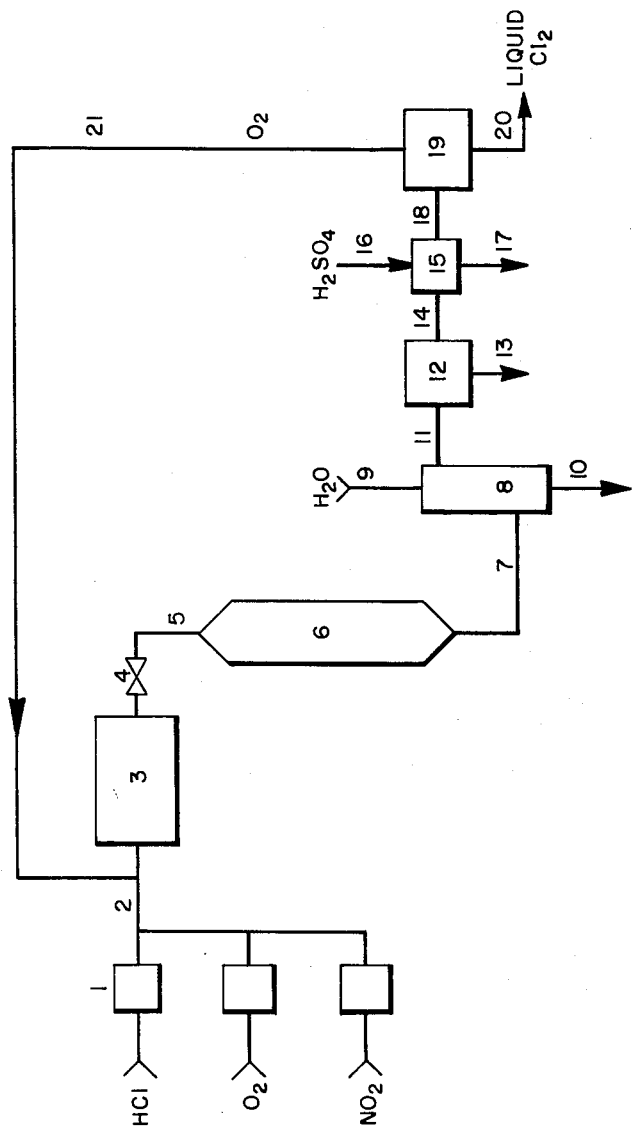
FREDERIC S. STOW, JR.
*INVENTOR.*
BY Ernest G. Peterson
AGENT

United States Patent Office 3,131,028
Patented Apr. 28, 1964

3,131,028
CATALYTIC OXIDATION REACTION OF A HYDROGEN HALIDE TO PRODUCE THE CORRESPONDING HALOGEN IN A SINGLE STAGE, HOMOGENEOUS, VAPOR PHASE USING $NO_2$ AS A CATALYST
Frederic S. Stow, Jr., Hockessin, Del., assignor to Hercules Powder Company, Wilmington, Del., a corporation of Delaware
Filed May 7, 1962, Ser. No. 192,895
10 Claims. (Cl. 23—215)

This invention relates to a new process for the oxidation of hydrogen chloride to chloride and more particularly to a vapor phase process wherein hydrogen chloride is reacted with oxygen in the presence of nitrogen dioxide as a homogeneous catalyst.

Hydrogen chloride is a by-product in many commercial operations, particularly in chlorination processes. Since this is quite frequently a waste by-product with attendant substantial neutralization and disposal costs, it becomes economically desirable to convert the hydrogen chloride to usable chlorine. Because of the importance of recovering the chlorine from hydrogen chloride, many processes have been developed. It is, of course, well known that hydrogen chloride can be oxidized by means of oxygen to produce chlorine according to the following basic reaction:

$$4HCl + O_2 \rightleftharpoons 2Cl_2 + 2H_2O$$

The reaction is favored thermodynamically at temperatures below about 550° C. However, at such temperatures the rate of reaction is far too low to be practical. Various catalysts for speeding up the reaction have been suggested, generally metal chlorides, as, for example, copper chloride and, more recently, iron and chromium salts, and mixtures of salts. This type of process generally involves a cycle wherein the metal oxide is reacted with hydrogen chloride to produce the metal chloride, which is subsequently oxidized to form the metal oxide and liberate chlorine.

Another type of process for oxidizing hydrogen chloride to chlorine is the use of nitric acid or nitrogen oxides as oxidizing agents. Such reactions are carried out in liquid phase as, for example, a solution of hydrogen chloride in aqueous nitric acid or in aqueous hydrogen chloride through which nitrogen dioxide and air are blown, or they are carried out in vapor phase using nitric acid or nitrogen dioxide as the oxidizing agent. In all of these reactions stoichiometric amounts of the nitric acid or nitrogen oxide, including nitrogen dioxide, are required, and at least two stages of oxidation are required to achieve high conversions. In addition, a sulfuric acid scrubbing step is required to remove the water, etc., present in the product.

Now, in accordance with this invention, it has been found that hydrogen chloride can be oxidized in a single stage to chlorine in vapor phase with oxygen using catalytic amounts of nitrogen dioxide as catalyst. The reaction which takes place is as follows:

$$2HCl + NO_2 \rightarrow Cl_2 + H_2O + NO$$
$$2NO + O_2 \rightarrow 2NO_2$$

This catalytic cycle is repeated many times until the equilibrium degree of conversion of HCl to $Cl_2$ is reached, at which point the gas is chiefly chlorine and water with small amounts of nitrogen dioxide, nitric oxide, nitrosyl chloride, oxygen and hydrogen chloride. Because of the small amount of nitrogen dioxide present, the equilibrium governing the conversion is essentially $$4HCl + O_2 \rightleftharpoons 2Cl_2 + 2H_2O$$

Many advantages may be cited for the process of the present invention over those of the prior art. The amount of nitrogen dioxide used is so small as to contribute a negligible cost to the process, and no recovery and recycle of nitrogen oxides is necessary from an economic standpoint to make the process competitive. Another important advantage is that the reaction is carried out in a single stage and no secondary oxidation reactors are required to order to achieve a high conversion. The reactor may be a simple tubular system and avoids the expensive catalyst beds of the prior art processes. Since the operation is strictly a gas phase reaction, the corrosion problems are markedly reduced, compared to liquid phase processes. Also the gases separated from the chlorine condensation step can be recycled to the reactor without pretreatment.

Instead of nitrogen dioxide itself ($NO_2$) as the catalyst, the process can be operated with any other nitrogen oxide as the catalyst as, for example, nitric oxide (NO), nitrogen tetroxide ($N_2O_4$), and other nitrogen oxides such as $N_2O_3$, $NO_2NO_3$, $NO_2O_5$, nitrosyl chloride (NOCl), nitrosyl bromide, nitrosyl iodide, nitryl chloride ($NO_2Cl$), nitryl bromide, nitryl iodide, nitric acid ($HNO_3$), or nitrous acid ($HNO_2$), or any mixture of these nitrogen oxides, all of which yield $NO_2$ under the reaction conditions, i.e., which on reaction with the HCl, $Cl_2$ or $O_2$ in the system form $NO_2$ which catalyzes the oxidation of hydrogen chloride to chlorine. Thus:

$$2NO + O_2 \rightarrow 2NO_2$$
$$2NOCl + O_2 \rightarrow 2NO_2 + Cl_2$$
$$2HNO_3 + 2HCl \rightarrow Cl_2 + 2NO_2 + 2H_2O$$

Consequently, any nitrogen oxide or other nitrogen compound which can produce nitrogen dioxide under the reaction conditions may be used.

Since the nitrogen dioxide acts as a catalyst for the process and is continuously regenerated during the process, any amount of it from a minor catalytic amount up may be used. Generally the amount of nitrogen dioxide used (or produced in situ will be within the range of from about 0.005 mole to about 0.25 mole per mole of hydrogen chloride being oxidized, and preferably will be from about 0.01 to about 0.10 mole per mole of hydrogen chloride.

The mole ratio of oxygen to hydrogen chloride used in carrying out the process may be varied from about 1:10 to about 1:1 and preferably will be within the range of from about 1:5 to about 1:2, the theoretical amount required being, of course, 1:4.

The reaction temperature and pressure can be varied over a considerable range. Generally the temperature will be maintained within the range of from about 250° C. to about 550° C. and preferably from about 375° C. to about 450° C. Higher temperatures may be used, but the production of chlorine from the reaction of hydrogen chloride and oxygen is favored thermodynamically at temperatures below about 550° C., and the present process enables the use of a temperature below 550° C. The pressure can be varied from atmospheric pressure up to about 200 atmospheres or higher, the maximum being the pressure at which water condenses from the reaction mixture at the reaction temperature. With increasing pressures, the amount of catalyst required to maintain a given rate of reaction is smaller. Generally, for the most desirable rates of reaction, the pressure will be within the range of from about 5 to 20 atmospheres. The time required for the reaction will vary from a few seconds up to several hours, depending on the operating conditions, such as temperature and pressure, as well as the percent conversion desired, etc. Thus, for a given temperature the time of reaction may be decreased by increasing either the pressure or the catalyst concentration. The desired range of reaction times which are limited practically by the size of the reactor required will be from about 0.1 to about 15 minutes, and more preferably from about 0.5 to about 5 minutes.

The process of this invention is more fully illustrated by reference to the attached drawing. This flow diagram is for illustrative purposes only and not by way of limitation as obviously many variations may be made therein without deviating from the scope of the invention.

The attached figure is a flow diagram for the continuous oxidation of hydrogen chloride by the process of this invention. The reaction gases, HCl, $O_2$ and $NO_2$, are metered through the meters 1 in the correct proportions through line 2 into the reactor 3 at elevated pressure. The pressure in the reactor is held at any desired elevated pressure up to the point of condensation of $H_2O$, approximately 200 atmospheres, by means of the pressure control valve 4. Effluent gas passes through line 5 into the heat exchanger 6 at atmospheric pressure or any desired elevated pressure not exceeding the reactor pressure. It may also be desirable to have an additional heat exchanger as an integral part of the reactor 3 if needed to remove the heat of reaction. The partially condensed product at essentially room temperature passes through line 7 into a scrubber 8 which is maintained at a temperature of 30° C. to about 70° C. The scrubbing liquid in the scrubber 8 is the liquid condensate, water containing the unreacted HCl, the $NO_2$ catalyst dissolved as $HNO_3$, and a negligible amount of dissolved chlorine. If necessary, to avoid evaporation of HCl from the scrubbing solution, water may be continuously added through line 9. The scrubbing solution is removed continuously through line 10 at a rate which maintains the proper liquid level in the scrubber. The gases from the scrubber, i.e., $Cl_2$, $O_2$ and a minor fraction of water vapor, pass through line 11 to a compressor 12 where the pressure is raised to 3–5 atmospheres at 20–40° C., under which conditions most of the remaining water is condensed and removed by line 13. The gases then pass through line 14 into a dehydrator 15 which generally is a scrubber using 96% $H_2SO_4$ as the scrubbing liquid which may be added as needed through line 16, the aqueous sulfuric acid being removed through line 17, this dehydrator being used to remove the small amount of water vapor which is generally within the range of 0–3% and any traces of nitrogen oxides that may be in the gas. The resulting dry mixture of chlorine and oxygen then passes through line 18 to the liquefaction unit 19. The liquid chlorine is taken from this unit by line 20 while the gaseous $O_2$, which probably contains some $Cl_2$ vapor is recycled to the reactor by way of line 21. The process may also be operated by eliminating the pressure control valve 4 so that the entire process is carried out under pressure up to the liquefaction unit 19, in which case the compressor 12 is eliminated. Under these conditions the reactor pressure has as its upper limit the vapor pressure of $Cl_2$ at the coolest point between 4 and 19. This limit varies from 6.62 atmospheres at 20° C. to 23 atmospheres at 70° C.

Many variations of the above procedure may be used. For example, air may be used in place of oxygen for the reaction. Similarly, other methods of recovering chlorine from the product may be used instead of liquefaction as, for example, absorption in solvents under pressure, etc. Alternatively, the scrubbing and separation of $O_2$, HCl, and oxides of nitrogen may be effected by solution in and recovery from water, with or without formation of the solid chlorine hydrate, or by low temperature fractionation of the condensed products.

The solution of unreacted HCl and $HNO_3$ taken from the scrubber by line 10 is usually discarded since the chemical values lost are relatively unimportant and are small in comparison to the cost of recovery. However, in a very large installation a unit to recover the HCl and $NO_2$ may be of sufficient economic value to warrant such a recovery step.

Any source may be used for the continuous supply of gaseous HCl in the above-described process. If storage or significant transportation of hydrogen chloride is involved, it may be desirable to collect the hydrogen chloride as a concentrated aqueous solution from which dry HCl may be distilled and sent to the reactor. Such absorption followed by distillation will be most useful in separating a noncondensable from the by-product HCl and permitting separation and recovery of any solvents used for the chlorination with which the by-product HCl may be saturated. These might react with the $NO_2$ or otherwise interfere with the oxidation process besides having substantial economic value. The less concentrated hydrogen chloride solution from the still may then be used to absorb additional hydrogen chloride from its source, such as the off-gases of a chlorination unit, again giving a concentrated hydrogen chloride solution from which the dry HCl may be distilled.

While the foregoing description has been with respect to the production of chlorine from hydrogen chloride, the process of this invention is equally applicable to the production of bromine from hydrogen bromide and iodine from hydrogen iodide using oxygen or an oxygen containing gas as the oxidizer and nitrogen dioxide as the homogeneous catalyst.

The process of this invention may, of course, be operated as a static reaction or as a flow reaction as described above. The following examples will illustrate both types of processes.

*Example 1*

A stream of reactant gas at atmospheric pressure which contained 74.4 mole percent HCl, 21.25 mole percent $O_2$ and 4.21 mole percent NO was passed through a 1140 ml. glass reactor held at 400° C. in a furnace. When the reactor was sufficiently flushed out so that it had reached an equilibrium condition as to its contents, both ends of the reactor were closed off. The reactor was maintained at 400° C. for 1 hour, after which time the contents were flushed with nitrogen through two bubbling towers in series, each containing 150 ml. of a 10% aqueous potassium iodide solution. The liberated iodine in the combined potassium iodide solutions was titrated with an aqueous 0.1 M solution of sodium thiosulfate. After addition of saturated aqueous potassium iodate solution, the additional free iodine corresponding to unreacted HCl was also titrated. Correcting the initial titration for that due to $NO_2$ (1 equivalent of sodium thiosulfate per mole of nitrogen dioxide), the product was shown to contain 14.84 milliequivalents of chlorine and 0.82 milliequivalent of unreacted hydrogen chloride which is equal to a conversion of 94.9%.

*Example 2*

A gas mixture of hydrogen chloride, oxygen, and NO was passed, at 3 atmospheres' pressure, through a 100-foot nickel alloy tube (about 76% Ni, 16% Cr and 8% Fe) having a volume of 2565 ml. and maintained at 400° C. at the rate of 0.0720 mole of hydrogen chloride, 0.0205 mole of oxygen and 0.00442 mole of NO per minute. The pressure was reduced at the end of the reactor (i.e., at the pressure relief valve 4 in the flow diagram) to atmospheric pressure. After allowing the system to reach equilibrium, the entire product was absorbed in an aqueous potassium iodide solution for a period of one minute. Aliquots of this solution were analyzed as in Example 1. By this means it was determined that the conversion of hydrogen chloride to chlorine was 35.4%.

*Example 3–18*

Examples 3–8 were carried out as described in Example 1, and Examples 9–18 were carried out as described in Example 2 except that in these examples the temperature, pressure and mole percent of nitrogen dioxide were varied. In each of these examples the mole ratio of oxygen to hydrogen chloride was kept constant at 1.1 to 4. The reaction conditions are set forth below, along with the reaction time that was required for a 90% conversion of hydrogen chloride to chlorine.

| Ex. | Temp., °C. | Pressure, Atm. | Mole Percent NO$_2$ | Mole Ratio, NO$_2$:HCl | Reaction Time |
|---|---|---|---|---|---|
| 3 | 300 | 1 | 4 | 0.052 | 3 hours. |
| 4 | 350 | 1 | 4 | 0.052 | 2 hours. |
| 5 | 400 | 1 | 4 | 0.052 | 40 min. |
| 6 | 450 | 1 | 4 | 0.052 | 1 hour. |
| 7 | 400 | 1 | 1.9 | 0.024 | 3 hours. |
| 8 | 400 | 1 | 0.7 | 0.0088 | 6 hours. |
| 9 | 400 | 2 | 4.3 | 0.056 | 4.5 min. |
| 10 | 400 | 3 | 4.3 | 0.056 | 2.5 min. |
| 11 | 400 | 5 | 4.3 | 0.056 | 1.5 min. |
| 12 | 400 | 5 | 2.7 | 0.034 | 5 min. |
| 13 | 400 | 10 | 2.0 | 0.025 | 1.5 min. |
| 14 | 400 | 10 | 1.5 | 0.019 | 3 min. |
| 15 | 400 | 10 | 1.0 | 0.013 | 7 min. |
| 16 | 400 | 15 | 2.0 | 0.025 | 0.7 min. |
| 17 | 400 | 15 | 1.5 | 0.019 | 1.5 min. |
| 18 | 400 | 15 | 1.0 | 0.013 | 3 min. |

*Example 19*

This example was carried out by the general procedure described in Example 2, except that air was used in place of oxygen and the flow of gas passed through the reactor tube in this case was under 2 atmospheres of pressure and was passed through the tube at 0.0493 mole of hydrogen chloride per minute, 0.614 mole of air per minute, and 0.00580 mole of nitric oxide per minute. This was a mole ratio of O$_2$:HCl of 0.26 and of NO$_2$:HCl of 0.117. The reactor temperature was 400° C. and the contact time was 47.8 seconds. The percent of HCl converted to Cl$_2$ under these conditions was 31.0%.

*Example 20*

This example was carried out by the general procedure described in Example 2 wherein the feed gases were under 5 atmospheres' pressure and contained 0.124 mole of HCl per minute, 0.0369 mole of oxygen per minute, and 0.00527 mole of nitric oxide per minute. Again the reactor temperature was 400° C. and in this case the contact time was 83.8 seconds. By this procedure there was obtained a 60% conversion of hydrogen chloride to chlorine.

*Example 21*

Using the general procedure described in Example 2, a gas stream consisting of 72.3 mole percent HCl, 5.56 mole percent NOCl and 22.1 mole percent oxygen was passed through the reactor tube at 400° C. under 14.4 p.s.i.g. pressure at the rate 2489 ml. per minute, which was a contact time of 72.6 seconds. Thus, the mole ratio of O$_2$:HCl was 0.31 and that of NO$_2$:HCl was 0.077. The percent HCl converted to Cl$_2$ under these conditions was 60.0%.

*Example 22*

Using the reactor and procedure described in Example 2, a gas stream consisting of 74.7 mole percent HCl, 20.5 mole percent O$_2$ and 4.77 mole percent HNO$_3$ vapor was passed through the reactor tube at 400° C. under 30 p.s.i.g. pressure at the rate of 2890 ml. per minute, which was a contact time of 65.8 seconds. The percent HCl converted to Cl$_2$ was 48.7%.

*Example 23*

A gas stream containing 74.1 mole percent HBr, 22.2 mole percent O$_2$ and 3.7 mole percent NO was passed through a static glass reactor of 1330 ml. volume at 122° C. When the reactor was sufficiently flushed out so that it had reached an equilibrium condition as to its contents, both ends of the reactor were closed off and the contents were allowed to react at 118–122° C for 10 minutes. The contents were then flushed out with nitrogen and absorbed in a 10% aqueous potassium iodide solution. Analysis, as described in Example 1, showed that 64.1% of the HBr was converted to Br$_2$. Thus, 10.8 millimoles of Br$_2$ were formed in the presence of 1.3 millimoles of the NO$_2$ catalyst.

*Example 24*

A glass reactor having a volume of 1330 ml. was loaded at 1 atmosphere pressure and 117° C. with a gas containing 76.9 percent HI and 23.1 percent O$_2$ by volume. By hypodermic syringe there was then added 36 ml. of NO and the mixture was allowed to react at 117–130° C. for 15 minutes. The product was removed and analyzed as described in Example 1. There was a 100% conversion of the 34.3 millimoles HI used to I$_2$ by the 1.46 millimoles of NO$_2$ catalyst (formed by oxidation of the NO added).

*Example 25*

The reactor used in the foregoing example was loaded with a gas mixture consisting of 69.4 mole percent HCl, 14.6 mole percent NO, and 16.0 mole percent O$_2$. (Mole ratio of O$_2$ to HCl of 0.23 and of NO$_2$ to HCl of 0.21.) The reaction was carried out at 400° C. and atmospheric pressure for 15 minutes. Analysis of the product showed that 83% of the HCl was converted to Cl$_2$.

*Example 26*

A glass reactor having a volume of 1330 ml. was loaded with a gas mixture consisting of 76.9 percent HCl and 23.1 percent O$_2$ by volume at atmospheric pressure and at a temperature of 407° C. There was then added by hypodermic syringe, 29.5 ml. of NO$_2$ gas and the mixture was allowed to react at 407° C. for 30 minutes. The product was removed and analyzed as described in Example 1. Of the 20.3 millimoles of HCl used, 15.6 millimoles were converted to Cl$_2$ in the presence of the 1.2 millimoles of NO$_2$ catalyst. This was a conversion of 77.0%.

As may be seen from the foregoing examples, the process of this invention has many advantages. The reactor is a simple tube or chamber, and the process does not require the maintenance of any catalyst bed or packing as in prior procedures. The reaction is a single-stage process and high conversions are obtained. The amount of NO$_2$ required by the process is negligible in so far as the over-all operation is concerned; and, hence, economic considerations do not dictate a need to recover it. The amount of unconverted acid to be recovered is extremely low. In carrying out the process of this invention it has been found that by operating the scrubber 8 at a temperature of from about 30° to about 70° C. essentially no nitrogen oxides pass through and need to be removed by a separate step at a later stage in the process. Many other advantages will be obvious to those skilled in the art.

What I claim and desire to protect by Letters Patent is:

1. A process of oxidizing a hydrogen halide to the corresponding halogen which comprises contacting in a single-stage, homogeneous, vapor phase reaction, the hydrogen halide gas with oxygen at a temperature of from about 250° C. to about 550° C. in the presence of nitrogen dioxide in an amount of from about 0.005 mole to about 0.25 mole per mole of hydrogen halide.

2. The process of oxidizing a hydrogen halide to the corresponding halogen which comprises contacting in a single-stage, homogeneous, vapor phase reaction, the hydrogen halide gas with oxygen in a molar ratio of from about 1:1 to about 10:1, respectively, at a temperature of of from about 250° C. to about 550° C. and under a pressure of from about 1 atmosphere to about 200 atmospheres in the presence of from about 0.005 mole to about 0.25 mole of nitrogen dioxide per mole of hydrogen halide.

3. The process of oxidizing a hydrogen halide to the corresponding halogen which comprises contacting in a single-stage, homogeneous, vapor phase reaction, the hydrogen halide gas with oxygen in a molar ratio of from about 1:1 to about 10:1, respectively, at a temperature of from about 375° C. to about 450° C. and under a pressure of from about 5 atmospheres to about 20 atmospheres in the presence of from about 0.005 mole to about 0.25 mole of nitrogen dioxide per mole of hydrogen halide.

4. The process of oxidizing a hydrogen halide to the corresponding halogen which comprises contacting in a single-stage, homogeneous, vapor phase reaction, the hydrogen halide gas with oxygen in a molar ratio of from about 1:1 to about 10:1, respectively, at a temperature of from about 375° C. to about 450° C. and under a pressure of from about 5 atmospheres to about 20 atmospheres in the presence of from about 0.01 mole to about 0.10 mole of nitrogen dioxide per mole of hydrogen halide.

5. The process of claim 4 wherein nitric oxide is used as the source of nitrogen dioxide.

6. The process of claim 4 wherein nitric acid is used as the source of nitrogen dioxide.

7. The process of claim 4 wherein nitrosyl chloride is used as the source of nitrogen dioxide.

8. The process of claim 4 wherein hydrogen chloride is oxidized to chlorine.

9. The process of claim 4 wherein hydrogen bromide is oxidized to bromine.

10. The process of claim 4 wherein hydrogen iodide is oxidized to iodine.

References Cited in the file of this patent

UNITED STATES PATENTS

| | | |
|---|---|---|
| 2,395,314 | Blumer | Feb. 19, 1946 |
| 2,855,279 | Walter | Oct. 7, 1958 |